(12) United States Patent
Huang et al.

(10) Patent No.: US 11,393,432 B2
(45) Date of Patent: Jul. 19, 2022

(54) ROTATIONAL IMAGE VIEWER

(71) Applicants: Justin Huang, Los Angeles, CA (US); Oleksandr Romanov, Sunnyvale, CA (US)

(72) Inventors: Justin Huang, Los Angeles, CA (US); Oleksandr Romanov, Sunnyvale, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/031,353

(22) Filed: Sep. 24, 2020

(65) Prior Publication Data

US 2022/0093064 A1    Mar. 24, 2022

(51) Int. Cl.
*G09G 5/373* (2006.01)
*G06F 3/0346* (2013.01)
*G06F 3/01* (2006.01)
*G06F 3/041* (2006.01)

(52) U.S. Cl.
CPC ............. *G09G 5/373* (2013.01); *G06F 3/017* (2013.01); *G06F 3/0346* (2013.01); *G06F 3/041* (2013.01); *G09G 2354/00* (2013.01)

(58) Field of Classification Search
CPC ....... G09G 5/373; G06F 3/017; G06F 3/0346; G06F 3/041
USPC ................ 345/419, 426, 427, 659; 359/610; 600/407; 715/730
See application file for complete search history.

(56) References Cited

U.S. PATENT DOCUMENTS

| | | | |
|---|---|---|---|
| 6,487,020 B1* | 11/2002 | Favalora | H04N 13/393 |
| | | | 359/619 |
| 8,994,719 B1* | 3/2015 | Mudure | G06T 17/05 |
| | | | 345/419 |
| 10,026,381 B2 | 7/2018 | Li et al. | |
| 2006/0241370 A1* | 10/2006 | Kramp | A61B 6/488 |
| | | | 600/407 |
| 2008/0291201 A1* | 11/2008 | Lafon | G06T 15/205 |
| | | | 345/427 |
| 2009/0006968 A1* | 1/2009 | Trask | G06F 16/4393 |
| | | | 715/730 |
| 2013/0104076 A1 | 4/2013 | Cristescu et al. | |
| 2014/0063061 A1 | 3/2014 | Reitan | |
| 2014/0098027 A1* | 4/2014 | Sultenfuss | G06F 3/04886 |
| | | | 345/173 |
| 2014/0192053 A1* | 7/2014 | Bi | H04N 13/279 |
| | | | 345/426 |
| 2017/0237983 A1 | 8/2017 | Adsumilli et al. | |

(Continued)

FOREIGN PATENT DOCUMENTS

KR    1020170052522 A    5/2017

OTHER PUBLICATIONS

International Search Report and Written Opinion for International Application No. PCT/US2021/051087, dated Jan. 6, 2022 (Jun. 1, 2022)—9 pages.

*Primary Examiner* — Prabodh M Dharia
(74) *Attorney, Agent, or Firm* — Culhane Meadows PLLC; Stephen J. Weed

(57) ABSTRACT

A rotational image viewer for viewing an image on a mobile device having a display including a viewport. The image viewer monitors the orientation of the mobile device and enlarges/reduces the image responsive to the mobile device's orientation such that the viewport remains filled with at least a portion of the image (i.e., no letterboxing or pillarboxing within the viewport).

20 Claims, 9 Drawing Sheets

(56) References Cited

U.S. PATENT DOCUMENTS

2018/0091728 A1\* 3/2018 Brown ................. G06F 3/0488
2020/0105063 A1   4/2020 Wang et al.
2020/0137375 A1\* 4/2020 Kroon ................. H04N 13/275
2020/0244901 A1\* 7/2020 Douady-Pleven ...... G06T 5/006

\* cited by examiner

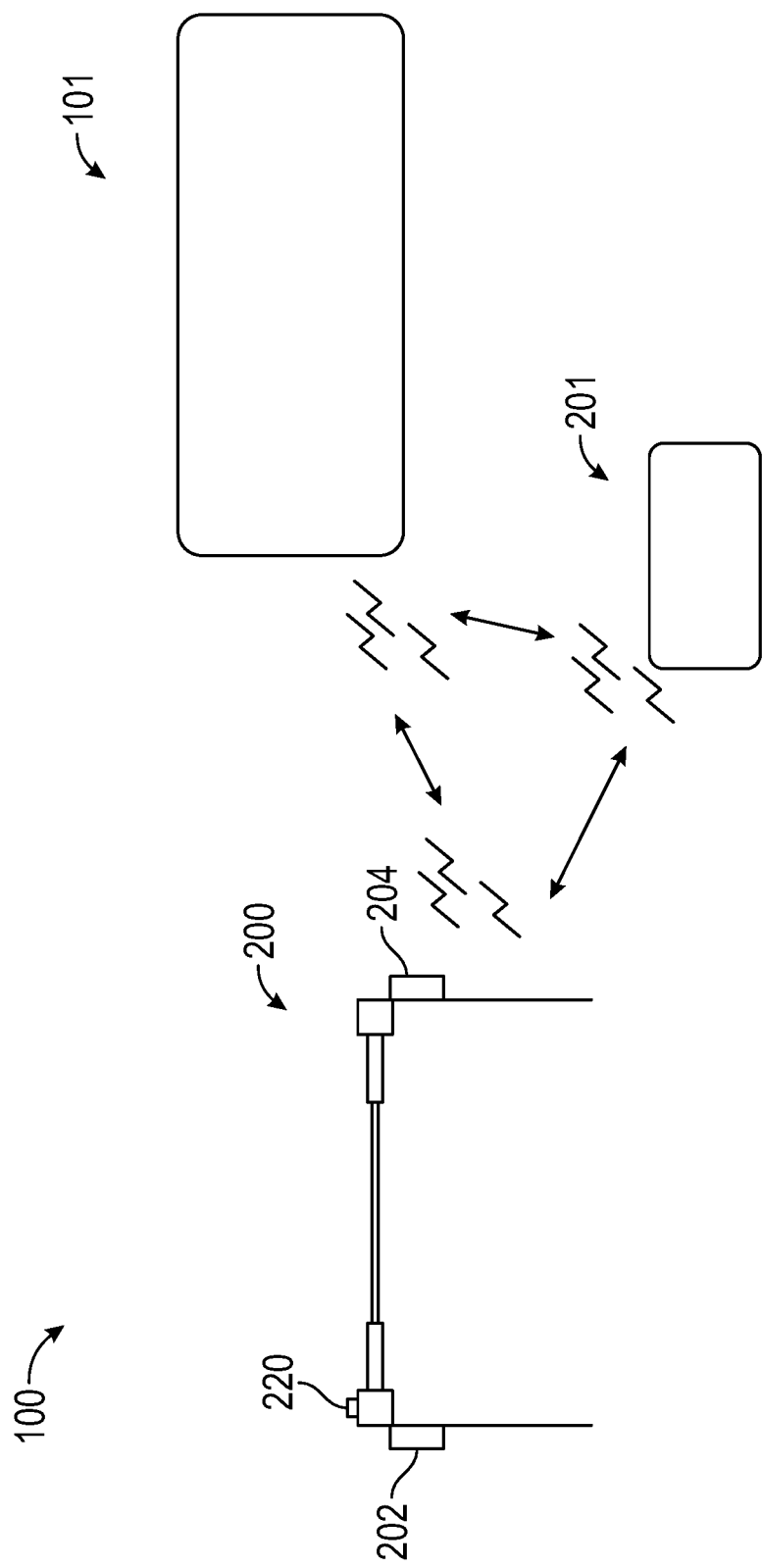

ROTATIONAL IMAGE VIEWER

TECHNICAL FIELD

This disclosure relates to mobile devices with viewers for viewing images on displays. More specifically, this disclosure relates to rotational image viewers that monitor the orientation of the mobile device and expand/contract the image to fill a viewport of a display.

BACKGROUND

Many types of mobile devices available today, such as smartphones, tablets, laptops, and handheld devices, include a variety of cameras, sensors, wireless transceivers, input systems (e.g., touch-sensitive surfaces, pointers), peripheral devices, displays, and graphical user interfaces (GUIs) through which a user can interact with displayed content.

The display of a mobile device enables a user to view images (still or video) captured by the mobile device or another device.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element. When referring to such elements collectively or to one or more non-specific elements, the lower-case letter may be omitted.

The various elements shown in the figures are not drawn to scale unless otherwise indicated. The dimensions of the various elements may be enlarged or reduced in the interest of clarity. The several figures depict one or more implementations that are presented by way of example only and should not be construed as limiting. Included in the drawing are the following figures:

FIG. 2 is a schematic illustration of an image capture device (eyewear device), mobile device with rotational image viewer, and a network device;

DETAILED DESCRIPTION

Figure 1:
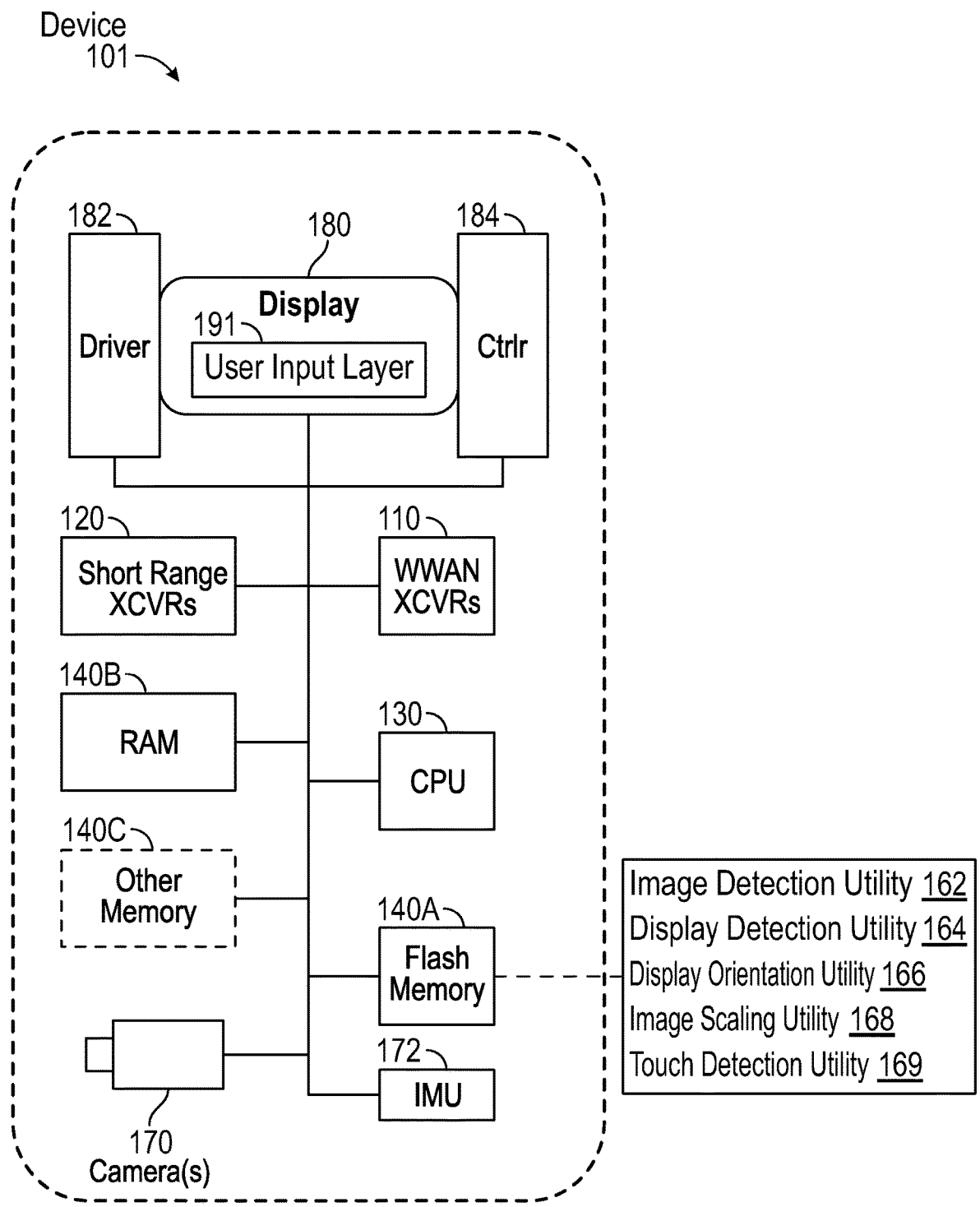
FIG. 1 is a diagrammatic representation of an example hardware configuration for a mobile device with a rotational image viewer.

Various implementations and details are described with reference to examples including a rotational image viewer for a mobile device (such as a cellular telephone). The rotational image viewer enables viewing an image on the mobile device within a viewport. The image viewer monitors the orientation of the mobile device and enlarges/reduces the image responsive to the mobile device's orientation such that the viewport remains filled with at least a portion of the image (i.e., no letterboxing or pillarboxing within the viewport).

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, other mobile devices, associated components and any other devices incorporating, for example, a camera, an inertial measurement unit, or both such as shown in any of the drawings, are given by way of example only, for illustration and discussion purposes. In operation, the devices may be oriented in any other direction suitable to the particular application of the device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1 is a high-level functional block diagram of an example mobile device 101 with a rotational image viewer. Mobile device 101 includes a flash memory 140A that stores programming to be executed by a CPU 130 to perform all or a subset of the functions described herein.

The mobile device 101 includes a camera 170 that includes at least one visible-light camera (e.g., first and second visible-light cameras with overlapping fields of view). Flash memory 140A may further include multiple images or video, which are generated via the camera 170 or received from another device via transceivers 110/120.

As shown, the mobile device 101 includes an image display 180. An image display driver 182 and controller 184, under control of CPU 130, control the display of images on image display 180. In the example of FIG. 1, the image display 180 includes a user input layer 191 (e.g., a touchscreen) that is layered on top of or otherwise integrated into the screen used by the image display 180. The image display driver 182 and controller 184 are coupled to CPU 130 in order to drive the display 180.

The mobile device may be a touchscreen-type mobile device. Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 1 therefore provides a block diagram illustration of the example mobile device 101 with a user interface that includes a touchscreen input layer 191 for receiving input (by touch, multi-touch, or gesture, and the like, by hand, stylus or other tool) and an image display 180 for displaying content.

As shown in FIG. 1, the mobile device 101 includes at least one digital transceiver (XCVR) 110, shown as WWAN XCVRs, for digital wireless communications via a wide-area wireless mobile communication network. The mobile device 101 also includes additional digital or analog transceivers, such as short-range transceivers (XCVRs) 120 for short-range network communication, such as via NFC, VLC, DECT, ZigBee, Bluetooth™, or WiFi. For example, short range XCVRs 120 may take the form of any available two-way wireless local area network (WLAN) transceiver of a type that is compatible with one or more standard protocols of communication implemented in wireless local area networks, such as one of the WiFi standards under IEEE 802.11.

The eyewear device 200 includes one or more motion/orientation-sensing components referred to as an orientation sensor (IMU) 172. The motion-sensing components may be micro-electro-mechanical systems (MEMS) with microscopic moving parts incorporated into a microchip. The orientation sensor 172 in some example configurations includes an accelerometer, a gyroscope, and a magnetometer. The accelerometer senses the linear acceleration of the device 101 (including the acceleration due to gravity) relative to three orthogonal axes (x, y, z). The gyroscope senses the angular velocity of the device 101 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 101 relative to magnetic north. The position of the device 101 may be determined by location sensors, such as a GPS unit, one or more transceivers to generate relative position coordinates, altitude sensors or barometers, and other orientation sensors.

The orientation sensor 172 may include or cooperate with a digital motion processor or programming that gathers the raw data from the components and compute a number of useful values about the position, orientation, and motion of the device 101. For example, the acceleration data gathered from the accelerometer can be integrated to obtain the velocity relative to each axis (x, y, z); and integrated again to obtain the position of the device 101 (in linear coordinates, x, y, and z). The angular velocity data from the gyroscope can be integrated to obtain the position of the device 101 (in spherical coordinates). The programming for computing these useful values may be stored in memory 140 and executed by the CPU 130.

To generate location coordinates for positioning of the mobile device 101, the mobile device 101 can include a global positioning system (GPS) receiver. Alternatively, or additionally the mobile device 101 can utilize either or both the short range XCVRs 120 and WWAN XCVRs 110 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 110, 120.

The transceivers 110, 120 (i.e., the network communication interface) conforms to one or more of the various digital wireless communication standards utilized by modern mobile networks. Examples of WWAN transceivers 110 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 110, 120 provide two-way wireless communication of information including digitized audio signals, still image and video signals, web page information for display as well as web-related inputs, and various types of mobile message communications to/from the mobile device 101.

The mobile device 101 further includes a microprocessor that functions as a central processing unit (CPU); shown as CPU 130 in FIG. 1. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 130, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 130 or processor hardware in smartphone, laptop computer, and tablet.

The CPU 130 serves as a programmable host controller for the mobile device 101 by configuring the mobile device 101 to perform various operations, for example, in accordance with instructions or programming executable by CPU 130. Example operations include various general operations of the mobile device, as well as operations related to the programming for applications on the mobile device 101.

The mobile device 101 includes a memory or storage system, for storing programming and data. In the example, the memory system includes a flash memory 140A, a random-access memory (RAM) 140B, and other memory components 140C, as needed. The RAM 140B serves as short-term storage for instructions and data being handled by the CPU 130, e.g., as a working data processing memory. The flash memory 140A typically provides longer-term storage.

In the example of mobile device 101, the flash memory 140A is used to store programming or instructions for execution by the CPU 130. Depending on the type of device, the mobile device 101 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The memory 140A includes an image detection utility 162, a display detection utility 164, a display orientation utility 166, an image scaling utility 168, and a touch detection utility. The image detection utility 162 identifies and detects parameters of an image for display. The display detection utility 164 identifies and detects parameters of display on which the image will be displayed. The display orientation utility 166 detects orientation/rotation of the display (e.g., based on input from orientation sensor 172). The image scaling utility 168 scales the image responsive to the orientation/rotation to fill a viewport of the display, The touch detection utility identifies and detects gestures on the display (e.g., a finger press, drag or swipe) and adjusts the portion of the image presented in the viewport of the display responsive to gestures on the display.

FIG. 2 is a functional block diagram of an example rotational image viewer system 100 that includes a mobile device 101 (e.g., a cellular telephone), another device (e.g., an eyewear device 200), and a network device 201 connected via various networks such as the Internet.

As shown in FIG. 2, the eyewear device 200 includes a visible-light camera 220 that captures still images, video images, or both still and video images. The camera 220 may have a direct memory access (DMA) to high-speed circuitry within the eyewear device 200. The camera 220 may be used to capture a red, green, and blue (RGB) imaged scene. The eyewear device 200 additionally includes a processor 202 for processing images captured by the camera 220 and a transceiver 204 for sending, under control of the processor 202, the images to the mobile device 101 or server system 201.

The network device 201 may be one or more computing devices as part of a service or network computing system, for example, that include a processor, a memory, and network communication interface to communicate over the network with the mobile device 101 and another mobile device such as the eyewear device 200. In one example, the server system 201 receives images from the eyewear device 200 or the mobile device 101, optionally stores the received images, and sends the stored images to a requesting device such as the mobile device 101 or the eyewear device 200. The network device 201 may be a communication device such as a router or another device accessible over a network such as a server system. Suitable routers and server systems will be understood by one of skill in the art from the description herein.

The mobile device 101 may communicate directly with the eyewear device 200 (e.g., via a Bluetooth™ connection) or indirectly via a wireless network device 201. In one example, the eyewear device 200 and the mobile device 101 initially establish a direct Bluetooth connection. If the eyewear device 200 or the mobile device 101 determine that a WiFi connection is available and that bandwidth requirements exceed that available via Bluetooth, the eyewear device 200 and the mobile device 101 may transition to communicating via WiFi. Otherwise, the eyewear device 200 and the mobile device 101 may continue using the direct Bluetooth connection, which has lower power consumption and less bandwidth than WiFi.

Figure 3A:
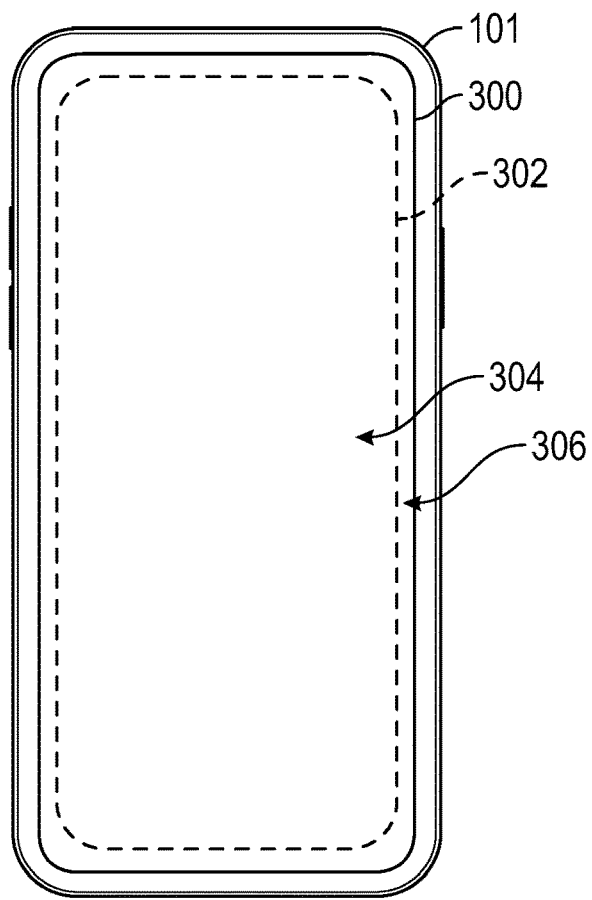
FIG. 3A is an illustration of a mobile device with rotational image viewer in a vertical orientation.

FIG. 3A depicts an example mobile device 101 in a horizontal orientation. The mobile device 101 includes a display 300 (e.g., display 180). The display 300 includes a viewport 302 for viewing images. In one example, viewport 302 is defined by the driver 182 and controller 184 of display 180. The viewport 302 may encompass the entire viewable area of the display 180 or a portion of the display 180 in which an interior area 304 of the display 180 displays at least a portion of the image being presented in the viewport 302 and an exterior area 306 of the display 180 may display one or more other images or a different portion of the same image.

Figure 3B:
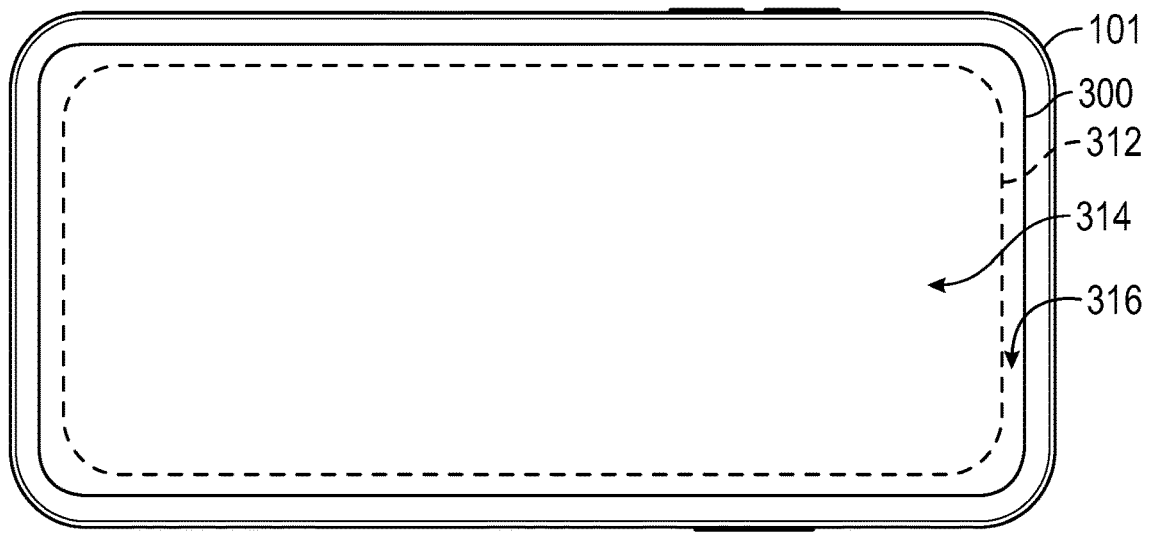
FIG. 3B is an illustration of the mobile device of FIG. 3A in a horizontal orientation.

FIG. 3B depicts the example mobile device 101 in a horizontal orientation. The viewport 312 of the display 300 (e.g., display 180) in the horizontal orientation may be the same as the viewport 302 (FIG. 3A) in the vertical orientation or it may be different. The viewport 312 may encompass the entire viewable area of the display 180 or a portion of the display 180 in which an interior area 314 of the display 180 displays at least a portion of the image being presented in the viewport 302 and an exterior area 316 of the display 180 may display one or more other images or a different portion of the same image.

FIG. 4A-4E depict examples of images and their relationship to a viewport of a display for use in describing the steps of FIGS. 5A-5E for implementing a rotational image viewer. In the images and examples, the aspect ratio of the image and its orientation with respect to the user is maintained regardless of the display orientation.

Figure 4A:
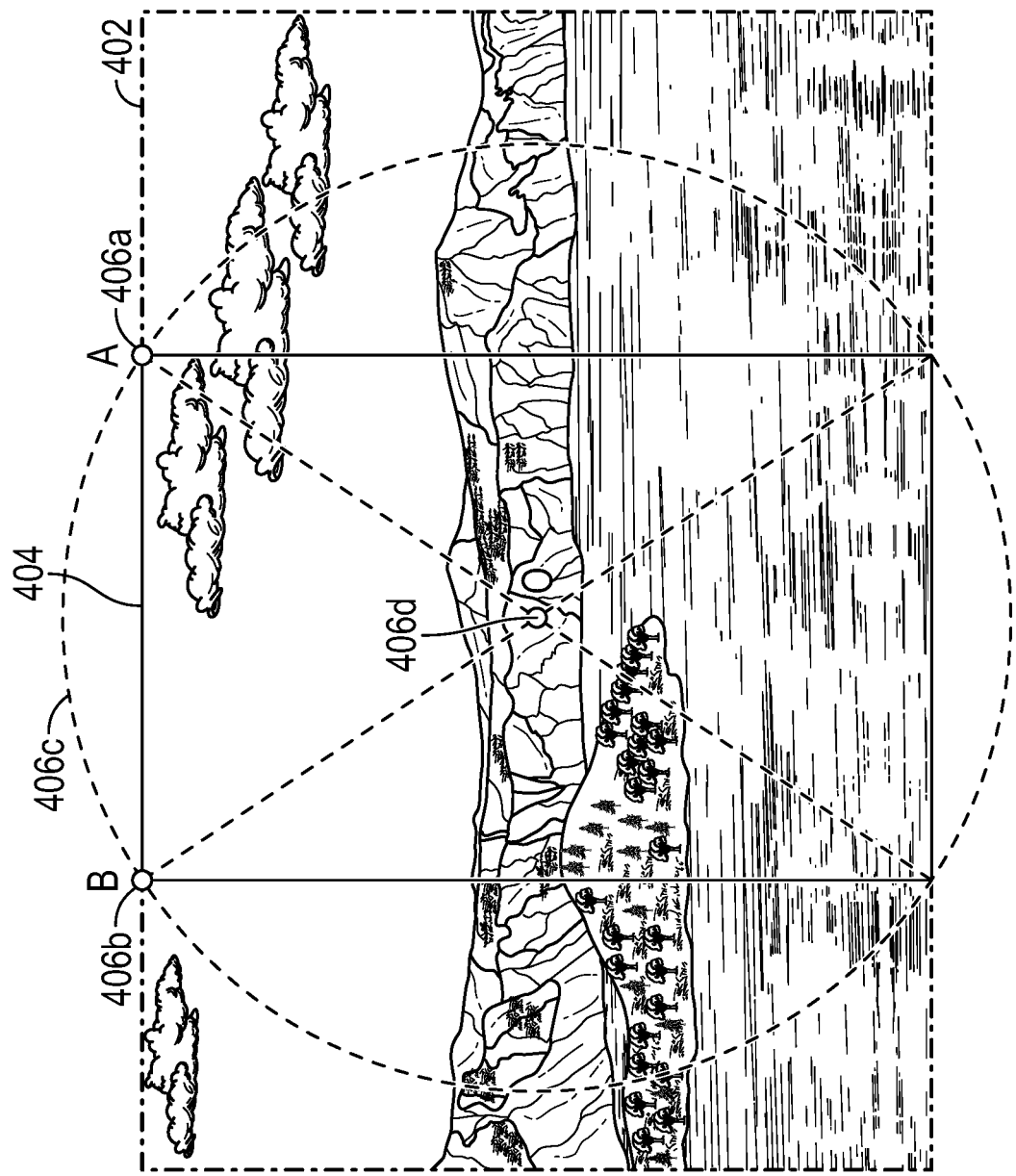
FIG. 4A is an illustration of a portion of an image filling a viewport of a mobile device in a vertical orientation.

FIG. 4A depicts an image 402 for viewing in a viewport 404 of a mobile device in a first orientation (e.g., a vertical/portrait orientation). The viewport 404 includes a pair of vertices on an edge of the viewport 404—a first vertex 406*a* (designated with letter A) and a second vertex 406*b* (designated with letter B). In an example, the pair of vertices are on an edge of the viewport 404 that coincides with an edge of the image 402 when the image is enlarged such that it fills the viewport 404 along one axis (e.g., a vertical axis) and extends beyond the viewport 404 in another axis perpendicular to that axis (e.g., a horizontal axis). In other words, the image fits to the height of the eligible viewport 404 with the image/media aspect ratio preserved. In this orientation, there may be portions of the image/media cut off from view in a horizontal dimension.

The viewport 404 is encompassed within a circle 406*c* having an origin 406*d* at the center of the display and a radius corresponding to the distance between the origin 406*d* and a vertex 406*a, b*. The origin 406*c* may be determined by calculating lines extending between vertices on opposite ends of the view port and identifying where the lines cross.

Figure 4B:
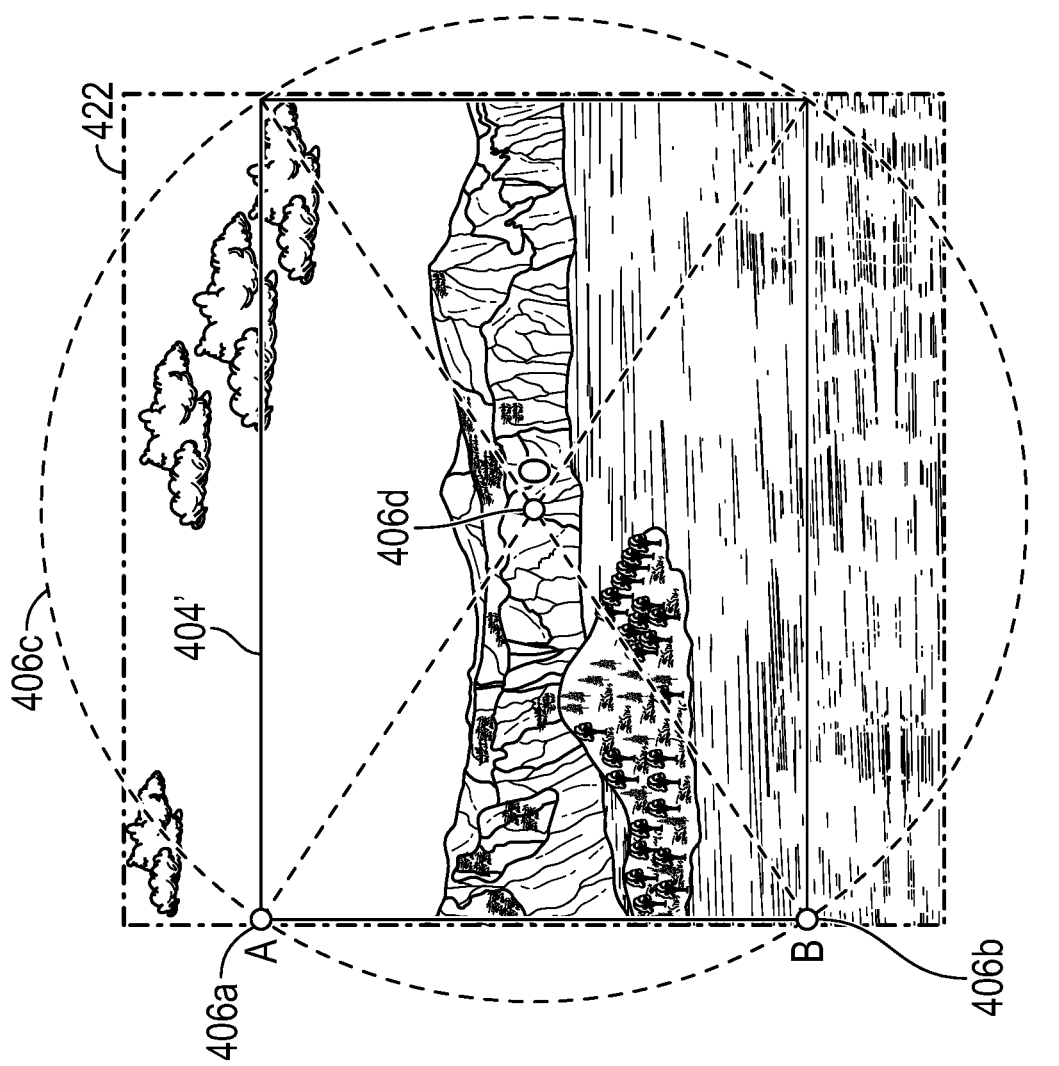
FIG. 4B is an illustration of a portion of the image filling a viewport of the mobile device of FIG. 4A in a horizontal orientation.

FIG. 4B depicts an image 422 (e.g., the same or a different image than in FIG. 4A) for viewing in a viewport 404' of a mobile device in a second orientation (e.g., a vertical/landscape orientation). The viewport 404' (which may have the same dimensions as viewport 404) includes the pair of vertices 406a, b on the edge of the viewport 404'. In an example, the pair of vertices are on an edge of the viewport 404' that coincide with the same edge of the image 402 as in FIG. 4A when the image is enlarged such that it fills the viewport along one axis (e.g., a horizontal axis) and extends beyond the viewport 404' in another axis perpendicular to that axis (e.g., a vertical axis). In other words, the image fits to the height of the eligible viewport 404' with the image/media aspect ratio preserved. In this orientation, there may be portions of the image/media cut off from view in a vertical dimension.

Figure 4C:
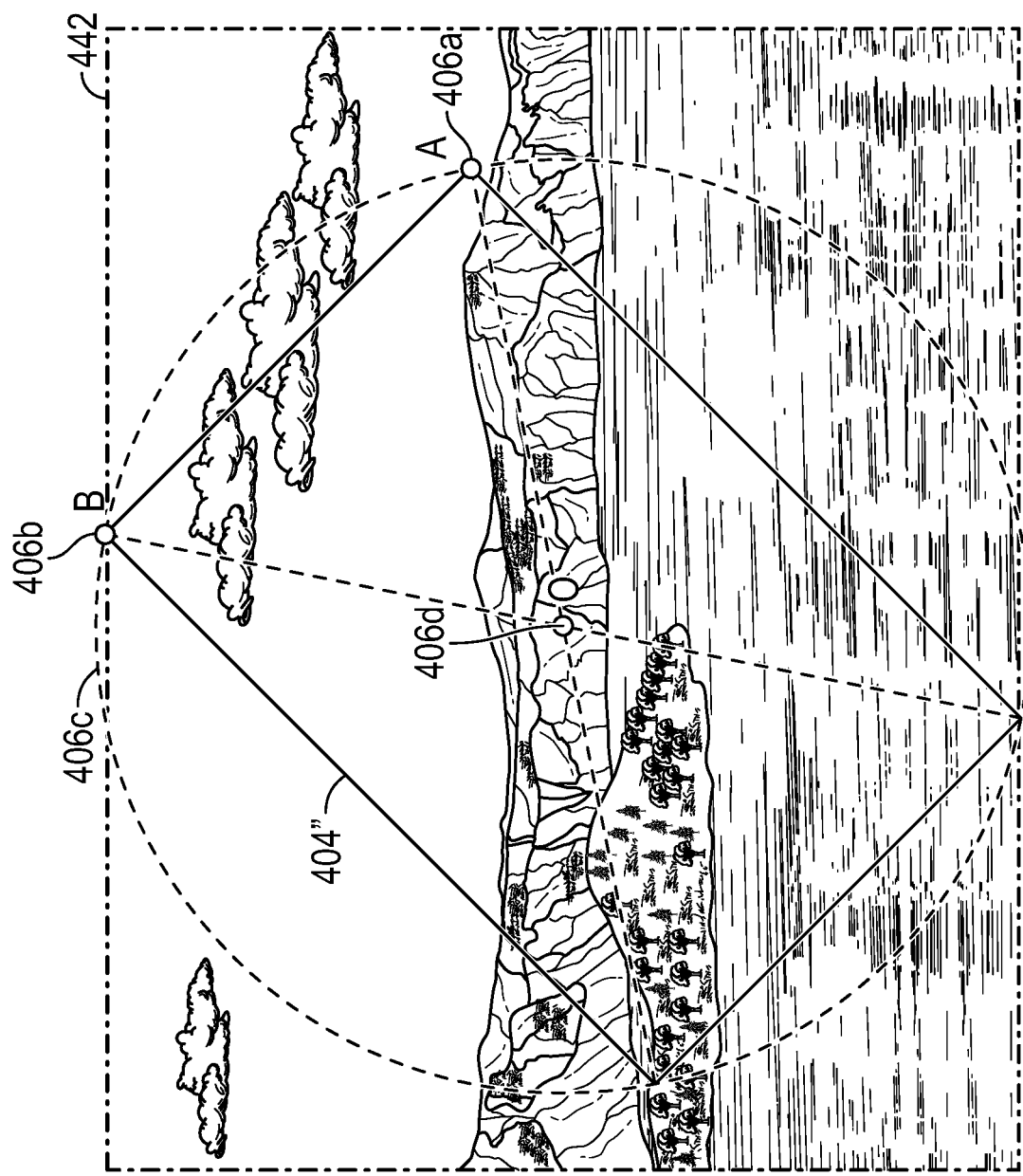
FIG. 4C is an illustration of a portion of the image filling a viewport of the mobile device of FIGS. 4A and 4B as the mobile device transitions between the vertical orientation and the horizontal orientation

FIG. 4C depicts an image 442 (e.g., the same or a different image than in FIGS. 4A and 4B) for viewing in a viewport 404" of a mobile device in an orientation between the first orientation (FIG. 4A) and the second orientation (FIG. 4B). When the display rotates, the rotational image viewer scales the image differently along rotational angles to fill the viewport. In other words, the eligible viewport 704" is always filled with the image (e.g., letterboxes and pillar boxes are not present). In this orientation, there may be portions of the image/media cut off from view in both the horizontal and vertical dimensions.

Figure 4D:
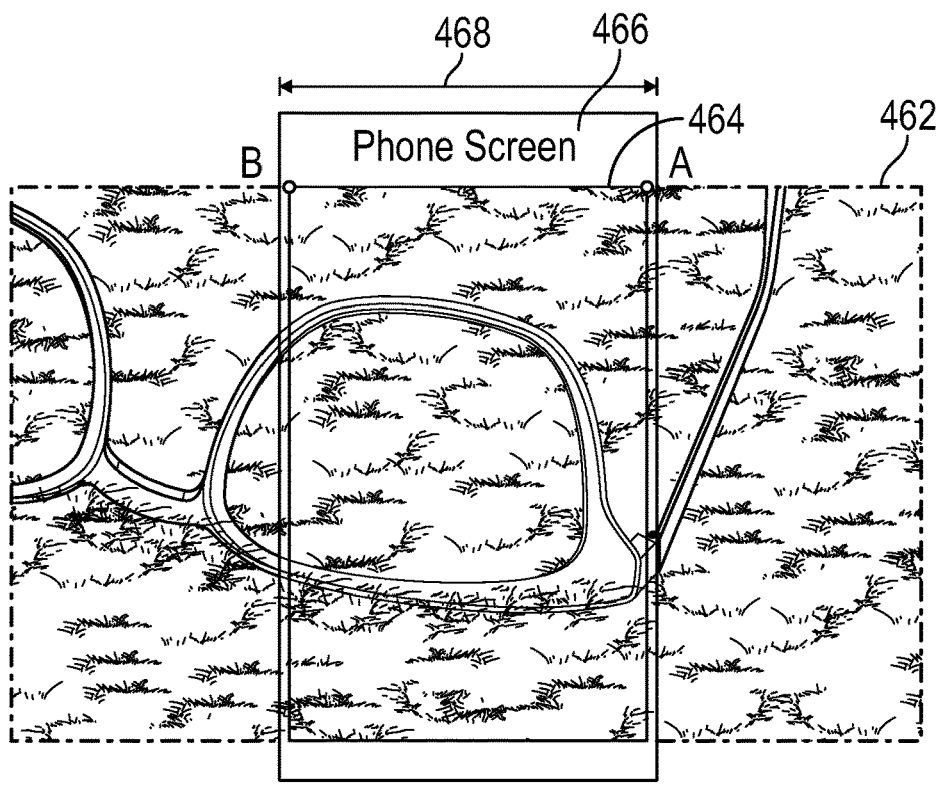
FIG. 4D is an illustration of a portion of another image filling a viewport of another mobile device in a vertical orientation.
Figure 4E:
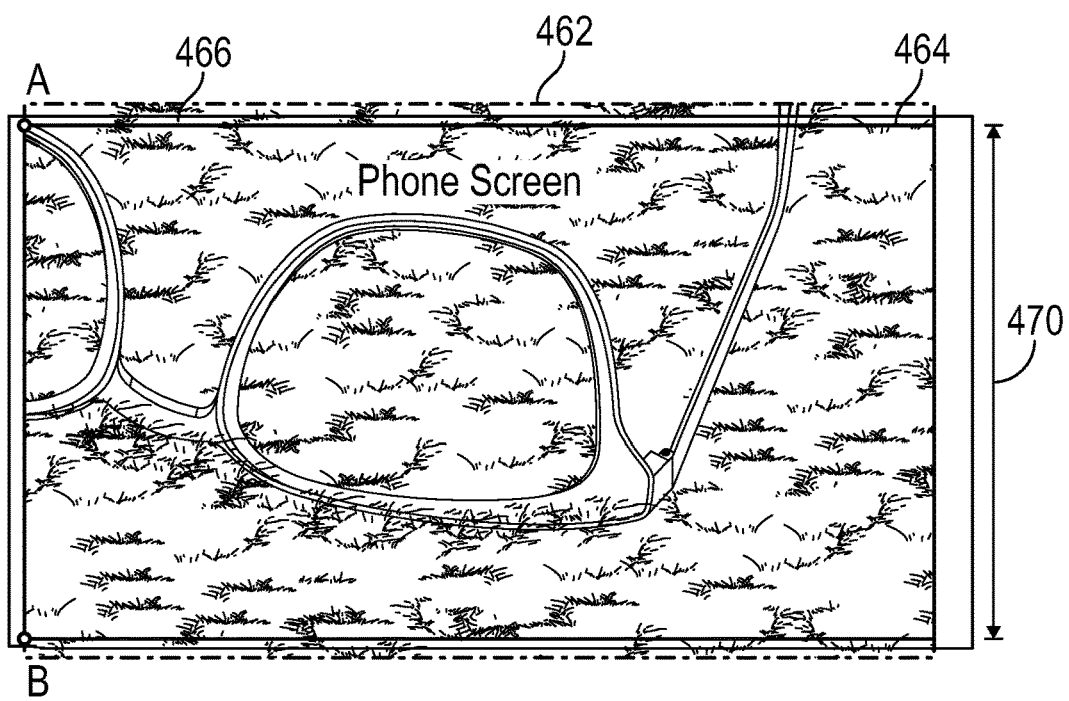
FIG. 4E is an illustration of a portion of the other image filling a viewport of the other mobile device in a horizontal orientation.

FIG. 4D depicts another image 462 for viewing in a viewport 464 of a mobile device 466 in a first orientation (e.g., a vertical/portrait orientation). FIG. 4E depicts the image 462 (e.g., the same as image in FIG. 4D) for viewing in a viewport 464 of the mobile device 466 in a second orientation (e.g., a vertical/landscape orientation).

FIGS. 5A-5E are respective flow charts 500, 504, 506, 508, and 510 listing steps in example methods for implementing a rotational image viewer. Although the steps are described with reference to the mobile device 101, other implementations of the steps described, for other types of electronic devices, will be understood by one of skill in the art from the description herein. Additionally, it is contemplated that one or more of the steps shown in FIGS. 5A-5E, and described herein, may be omitted, performed simultaneously or in a series, performed in an order other than illustrated and described, or performed in conjunction with additional steps.

Figure 5A:
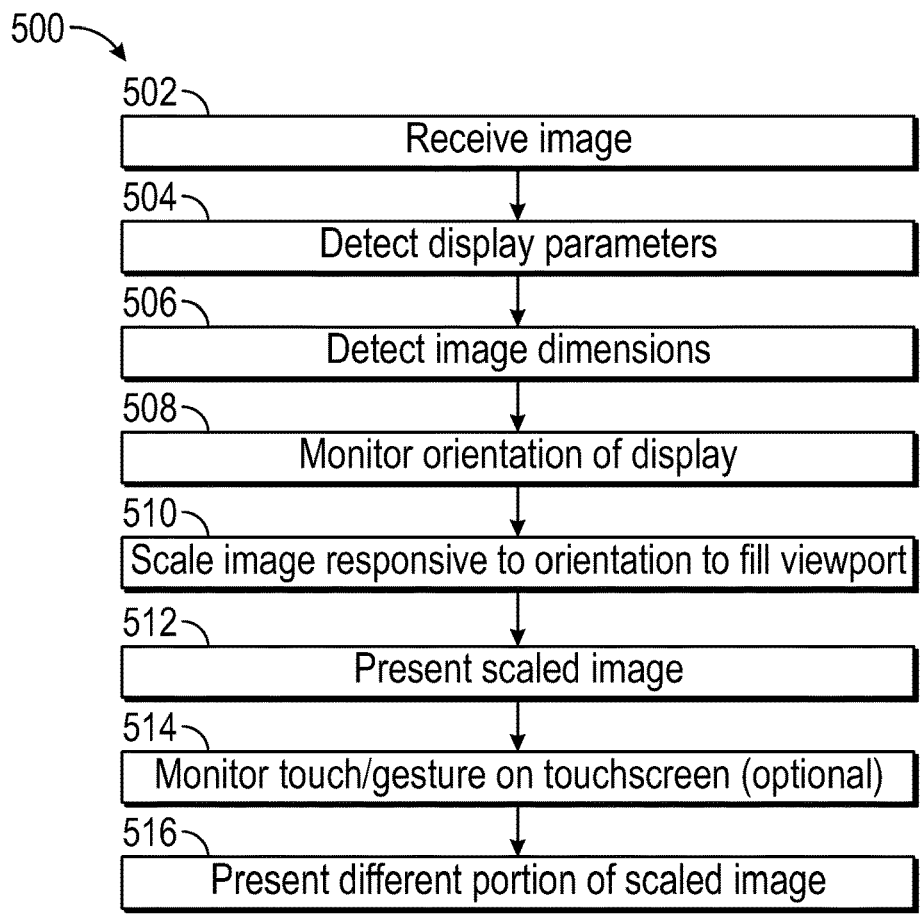
FIGS. 5A, 5B, 5C, 5D, and 5E are flow charts including steps for implementing a rotational image viewer.
Figure 5B:
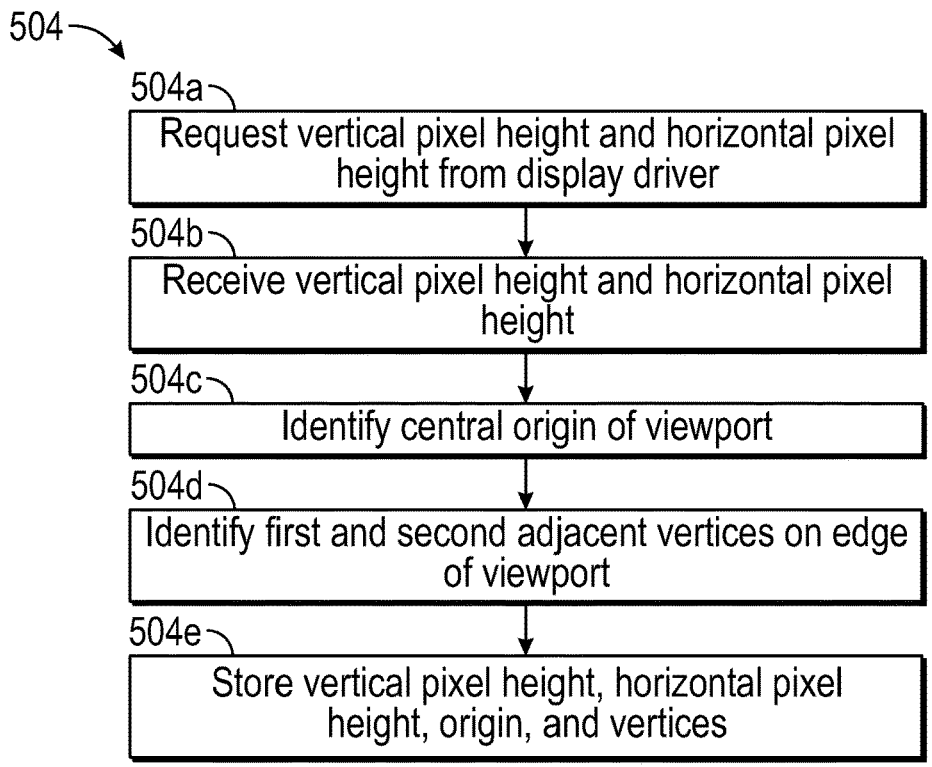
Figure 5C:
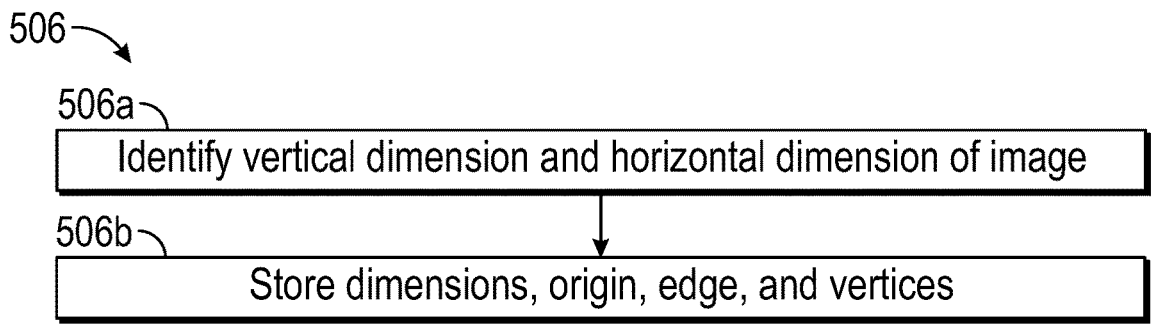
Figure 5D:
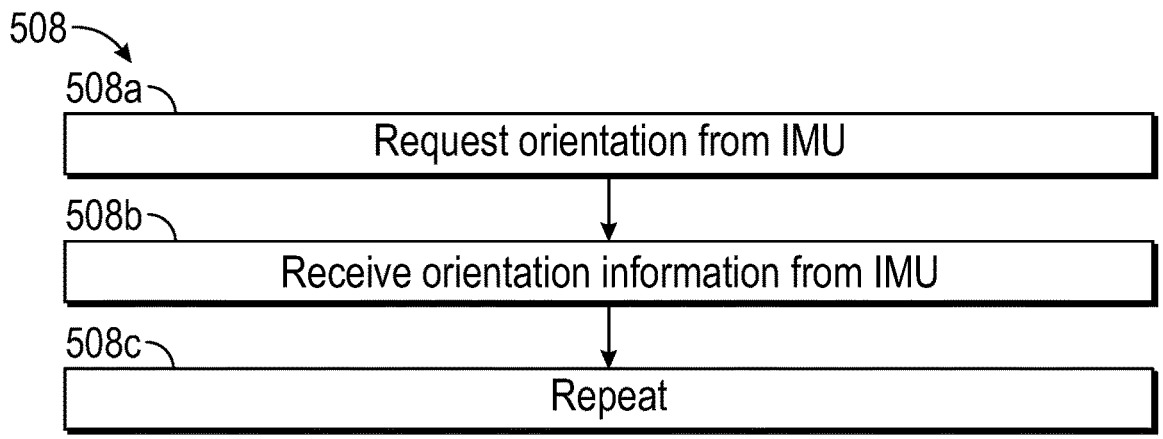
Figure 5E:
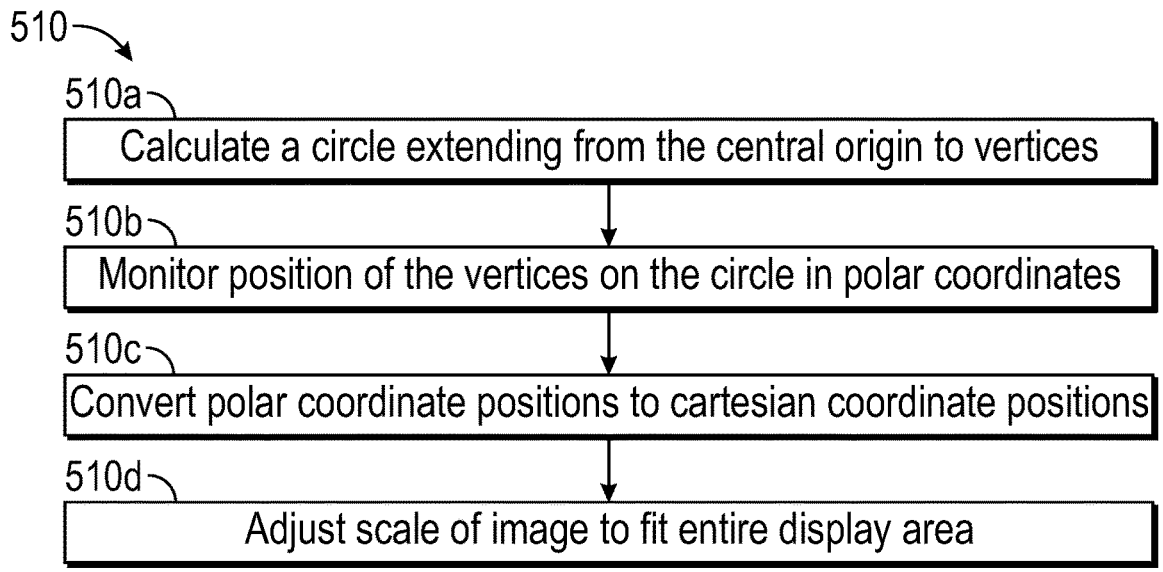

FIG. 5A depicts a flow chart 500 for viewing an image in a viewport of a display responsive to the orientation of the display. At block 502, the mobile device receives an image. In an example, the processor 130 of the mobile device 101 retrieves the image from memory 140. The processor 130 may have previously captured the image, e.g., using the camera 170, and stored the image in the memory 140. Alternatively, the processor may have received the image from another device, e.g., via a transceiver 110/120 and stored the image in the memory 140.

At block 504, the mobile device detects parameter of the viewport. In one example, the processor 130 detects the parameters by requesting a vertical pixel height and a horizontal pixel height of the viewport from the driver 182 of the display 180 (block 504a) and receiving the vertical pixel height the horizontal pixel from the driver 182 (block 504b). Using the received vertical pixel height and horizontal pixel height, the processor identifies a central origin of the viewport (block 504c), point 0, 0. The processor 130 may determine the central origin by dividing the vertical pixel height and the horizontal pixel height by a factor of two. The processor 130 then identifies first and second adjacent vertices (e.g., vertex A and vertex B; FIGS. 4A-4E) on an edge of the viewport (block 504d). With respect to the origin 0, 0, a first vertex (vertex A) may be located at one-half the received pixel height and one-half the pixel width and the second vertex (vertex B) may be located at one-half the received pixel height and minus one-half the pixel width. The processor 130 stores the vertical pixel height, horizontal pixel height, origin, and vertices in memory 140 (block 504e) for scaling calculations by the rotational image viewer.

At block 506, the mobile device detects dimensions of the image. In an example, the processor 130 identifies a vertical dimension and a horizontal dimension of the image (block 506a). The processor 130 may identify the dimensions by reading metadata associated with the image that includes the dimensions. The processor 130 stores the dimensions of the image in memory 140 (block 506b) for scaling calculations by the rotational image viewer.

At block 508, the mobile device monitors the orientation of the display. In one example, the processor 130 monitors the orientation by requesting the orientation from the IMU 172 (block 508a). The processor 130 then receives the orientation from the IMU 172 in response to the requests (block 508b), The processor periodically repeats the steps of blocks 508a and 508b (e.g., every 10 milliseconds based on an internally set timer) in order to scale and position the image within the viewport while reducing lag.

At block 510, the mobile device scales the image responsive to the monitored orientation of the display such that at least a portion of the image fills the viewport regardless of the monitored orientation. In an example, at block 510a, the processor 130 calculates a circle extending from the central origin to one of the first and second vertices (vertex A or vertex B). The processor 130 then monitor positions of the first and second vertices on the circle in polar coordinates responsive to the orientation information from the IMU 172 (block 510b). The processor 130 convert the polar coordinate positions to cartesian coordinate positions (block 510c) for use with the image. The processor 130 then adjusts the image to fill the viewport using the cartesian coordinate positions responsive to the polar coordinate positions of the first and second vertices on the circle (block 510d).

In an example, the image is initially centered within the viewport and sized such that a first image edge of the image is adjacent a first viewable edge of the viewport and a second image edge of the image extends beyond a second viewable edge of the viewport. Additionally, the circle includes at least an exterior portion that extends beyond the first viewable edge and an interior portion that does not extend beyond the first viewable edge. To scale the image, the processor 130 enlarges the image when a vertex, moving from the interior portion of the circle, reaches the exterior portion of the circle and reduces the image to maintain the vertex on the viewable edge when the vertex reaches an interior portion of the circle.

At block 512, the mobile device presents the scaled image. In an example, the processor 130 presents the image by sending the image along with appropriate scaling information to the image driver 182.

At block 514, optionally, the mobile device monitors touches/gestures on the display, movement of the display in a dimension other than the dimension used for rotational viewing of the image, or both. In one example, the processor 130 monitors touches/gestures on the user input layer 191. For example, a finger drag left or a finger drag left. In another example, the processor 130 monitors movement of the display in other dimensions, e.g., about an axis normal to the axis about which the rotational image view uses to the scale the image. For example, the rotation image viewer may scale the image responsive to rotation of the display about a first degree of freedom (e.g., a horizontal axis) and the processor 130 may additionally track movement about a second degree of freedom (e.g., a vertical axis) for taking another action.

At block 516, optionally, the mobile device presents different portions of the scaled image within the viewport on the touchscreen. In one example, the mobile device presents different portions responsive to gestures on the display. In another example, the mobile device presents different portions response to movement about a second degree of freedom. In an example, the processor 130 presents the image by sending the image along with appropriate scaling information and presentation portion (e.g., by adjusting the central origin) to the image driver 182. Rotation of the display to the right/left about a vertical axis or a finger drag to the right/left results in the processor 130 shifting the viewport 466 to the right/left along axis 468 (FIG. 4D). Similarly, rotation of the display to the top/bottom about a horizontal axis normal to the axis used by the rotational image viewer for scaling or a finger drag to the top/bottom results in the processor 130 shifting the viewport 466 up/down along axis 470 (FIG. 4E).

In accordance with this example, the processor scales the image responsive to the orientation in the first degree of freedom, and the processor is further configured to present different portions of the scaled image in the viewport responsive to the orientation in the second degree of freedom.

Pseudo code for an example rotational image viewer is depicted in Table 1:

TABLE 1

```
// mediaSize - original media size
// rotation - device rotation change
// radius - radius of the circle the rectangle is inscribed in
  Size fittingSize = {0.0, 0.0};
  {
    // The coordinates of the point A in the polar coordinate system
    Point Ap = {radius, φ}
    // The coordinates of point A in the cartesian coordinate system
    Point Ac = {abs(radius * cos(φ + rotation)), abs(radius * sin(φ + rotation))};
    fittingSize.height = 2.0f * Ac.y;
    fittingSize.width = 2.0f * Ac.x;
  }
  {
    // The coordinates of the point B in the polar coordinate system
    Point Bp = {radius, PI - φ};
    // The coordinates of point B in the cartesian coordinate system
    Point Bc = {abs(radius * cos(φ + rotation)), abs(radius * sin(φ + rotation))};
    fittingSize.height = MAX(fittingSize.height, 2.0f * Bc.y);
    fittingSize.width = MAX(fittingSize.width, 2.0f * Bc.x);
  }
  Float scaledWidth = mediaSize.width * fittingSize.height / mediaSize.height;
  // respecting the vertical dimension first
  if (scaledWidth >= fittingSize.width) {
    return {scaledWidth, fittingSize.height};
  } else {
    Float scaledHeight = fittingSize.width * mediaSize.height / mediaSize.width;
    return {fittingSize.width, scaledHeight};
  }
```

In this example, the processor tracks the movements of vertex A and vertex B (see FIGS. 4A-E) of the rectangle (i.e., the viewport) inscribed in the circle based on the current rotation angle in the polar coordinate system and convert them back to the Cartesian coordinate system to determine the minimum scale. Initially, the vertical dimension is respected—making the image/media fit to the height of the viewport precisely and cut off the media from view in a horizontal dimension. As soon as mattes or masking would start showing up in the horizontal dimension to maintain the aspect ratio of the image, the horizontal dimension is respected—making the image/media fit the width of the viewport precisely and cut off the media from view in a vertical dimension. In other words, when the image/media no longer completely fills the viewport such that letterboxing (horizontal mattes or masking) or pillarboxing (vertical mattes or masking) would conventionally be used to display the image/media, the image/media is enlarged to fill the viewport (while maintaining the aspect ratio) in the dimension that the mattes or masking would have conventionally been added.

Any of the functionality described herein for an electronic device (e.g., the mobile device 101 or the eyewear device 200) and the network device 201 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A rotational image viewer, the rotational image viewer comprising:
   a display having a viewport;
   an orientation sensor configured to monitor orientation of the display; and
   a processor coupled to the display and the orientation sensor, the processor configured to receive an image, detect parameter of the viewport, detect dimensions of the image, monitor the orientation of the display, scale the image responsive to the monitored orientation of the display such that at least a portion of the image fills the viewport regardless of the monitored orientation, and present the scaled image.

2. The viewer of claim 1, wherein the display is a touchscreen and wherein the processor is further configured to present different portions of the scaled image on the touchscreen responsive to gestures on the display.

3. The viewer of claim 1, wherein the orientation sensor is configured to monitor orientation of the display in a first degree of freedom and a second degree of freedom, the processor scales the image responsive to the orientation in the first degree of freedom, and the processor is further configured to present different portions of the scaled image in the viewport responsive to the orientation in the second degree of freedom.

4. The viewer of claim 1, wherein the display comprises a display driver that defines a vertical pixel height for the viewport and a horizontal pixel height for the viewport and wherein, to detect the parameters of the viewport, the processor requests the vertical pixel height and the horizontal pixel height from the display driver.

5. The viewer of claim 4, wherein the processor is further configured to identify a central origin of the viewport and first and second vertices of an edge of the viewport; and
   wherein the parameters of the viewport include the vertical pixel height, the horizontal pixel height, the central origin, the first vertex, and the second vertex.

6. The viewer of claim 5, wherein, to scale the image, the processor is configured to calculate a circle extending from the central origin to one of the first and second vertices, monitor positions of the first and second vertices on the circle in polar coordinates, convert the polar coordinate positions to cartesian coordinate positions, and adjust the image to fill the viewport using the cartesian coordinate positions responsive to the polar coordinate positions of the first and second vertices on the circle.

7. The viewer of claim 6, wherein the image is initially centered within the viewport and sized such that a first image edge of the image is adjacent a first viewable edge of the viewport and a second image edge of the image extends beyond a second viewable edge of the viewport and wherein the circle includes at least an exterior portion that extends beyond the first viewable edge and an interior portion that does not extend beyond the first viewable edge.

8. The viewer of claim 7, wherein, to scale the image, the processor enlarges the image when a first vertex, moving from the interior portion of the circle, reaches the exterior portion of the circle.

9. The viewer of claim 8, wherein, to scale the image, the processor reduces the image to maintain the first vertex on the first viewable edge when the first vertex reaches an interior portion of the circle.

10. A rotational image viewing method for use with an electronic device including a display having a viewport and an orientation sensor, the method comprising:
    receiving an image;
    detecting parameters of the viewport;
    detecting dimensions of the image;
    monitoring the orientation of the display;
    scaling the image responsive to the monitored orientation of the display such that at least a portion of the image fills the viewport regardless of the monitored orientation; and
    presenting the scaled image.

11. The method of claim 10, wherein the display is a touchscreen and wherein the method further comprises:
monitoring gestures on the touchscreen; and
presenting different portions of the scaled image on the touchscreen responsive to the gestures on the display.

12. The method of claim 10,
wherein the monitoring comprises monitor orientation of the display in a first degree of freedom and a second degree of freedom;
wherein the processor scales the image responsive to the orientation in the first degree of freedom, and
wherein the method further comprises presenting different portions of the scaled image in the viewport responsive to the orientation in the second degree of freedom.

13. The method of claim 10, wherein the display comprises a display driver that defines a vertical pixel height for the viewport and a horizontal pixel height for the viewport and wherein the detecting comprises requesting the vertical pixel height and the horizontal pixel height from the display driver.

14. The method of claim 13, further comprising:
identifying a central origin of the viewport and first and second vertices of an edge of the viewport;
wherein the parameters of the viewport include the vertical pixel height, the horizontal pixel height, the central origin, the first vertex, and the second vertex.

15. The method of claim 14, wherein the scaling comprises:
calculating a circle extending from the central origin to one of the first and second vertices;
monitoring positions of the first and second vertices on the circle in polar coordinates;
converting the polar coordinate positions to cartesian coordinate positions; and
adjusting the image to fill the viewport using the cartesian coordinate positions responsive to the polar coordinate positions of the first and second vertices on the circle.

16. The method of claim 15, wherein the image is initially centered within the viewport and sized such that a first image edge of the image is adjacent a first viewable edge of the viewport and a second image edge of the image extends beyond a second viewable edge of the viewport and wherein the circle includes at least an exterior portion that extends beyond the first viewable edge and an interior portion that does not extend beyond the first viewable edge.

17. The method of claim 16, wherein the scaling comprises:
enlarging the image when a first vertex, moving from the interior portion of the circle, approaches the exterior portion of the circle.

18. The method of claim 17, wherein the scaling further comprises:
reducing the image to maintain the first vertex on the first viewable edge when the first vertex approaches an interior portion of the circle.

19. A non-transitory computer-readable medium storing program code which, when executed on an electronic device including a display having a viewport, an orientation sensor, and a processor, is operative to cause the processor to perform the steps of:
receiving an image;
detecting parameters of the viewport;
detecting dimensions of the image;
monitoring the orientation of the display;
scaling the image responsive to the monitored orientation of the display such that at least a portion of the image fills the viewport regardless of the monitored orientation; and
presenting the scaled image.

20. The non-transitory computer-readable medium storing program code of claim 19, wherein the scaling comprises:
calculating a circle extending from a central origin of the display to one of first and second vertices on an edge of the viewport;
monitoring positions of the first and second vertices on the circle in polar coordinates;
converting the polar coordinate positions to cartesian coordinate positions; and
adjusting the image to fill the viewport using the cartesian coordinate positions responsive to the polar coordinate positions of the first and second vertices on the circle.

* * * * *